US008957161B2

(12) United States Patent
Obrecht et al.

(10) Patent No.: US 8,957,161 B2
(45) Date of Patent: Feb. 17, 2015

(54) PROCESS FOR REACTING CHEMICAL COMPOUNDS IN THE PRESENCE OF CATALYST SYSTEMS

(71) Applicant: LANXESS Deutschland GmbH, Cologne (DE)

(72) Inventors: Werner Obrecht, Moers (DE); Julia Maria Jeschko, Blaustein (DE); Oskar Nuyken, Munich (DE)

(73) Assignee: LANXESS Deutschland GmbH, Cologne (DE)

(*) Notice: Subject to any disclaimer, the term of this patent is extended or adjusted under 35 U.S.C. 154(b) by 0 days.

(21) Appl. No.: 13/961,459

(22) Filed: Aug. 7, 2013

(65) Prior Publication Data

US 2013/0324672 A1    Dec. 5, 2013

Related U.S. Application Data

(62) Division of application No. 12/961,876, filed on Dec. 7, 2010, now Pat. No. 8,530,584, which is a division of application No. 11/707,420, filed on Feb. 16, 2007, now abandoned.

(51) Int. Cl.
*C08F 20/44* (2006.01)
*C08C 19/08* (2006.01)
*B01J 31/22* (2006.01)
*C08C 19/02* (2006.01)
*C08G 61/08* (2006.01)
*C08C 19/00* (2006.01)

(52) U.S. Cl.
CPC .............. *C08C 19/08* (2013.01); *B01J 31/2265* (2013.01); *C08C 19/02* (2013.01); *C08G 61/08* (2013.01); *C08C 2019/09* (2013.01)
USPC ...................................................... 525/329.1

(58) Field of Classification Search
None
See application file for complete search history.

(56) References Cited

U.S. PATENT DOCUMENTS

| 3,700,637 | A | 10/1972 | Albert |
| 4,581,417 | A | 4/1986 | Buding et al. |
| 4,631,315 | A | 12/1986 | Buding |
| 4,746,707 | A | 5/1988 | Fiedler et al. |
| 4,795,788 | A | 1/1989 | Himmler et al. |
| 4,816,525 | A | 3/1989 | Rempel et al. |
| 4,978,771 | A | 12/1990 | Fiedler et al. |
| 5,969,170 | A | 10/1999 | Grubbs et al. |
| 6,683,136 | B2 | 1/2004 | Guo et al. |
| 6,867,303 | B2 | 3/2005 | Grela |
| 7,745,539 | B2 | 6/2010 | Guerin et al. |
| 7,750,172 | B2 | 7/2010 | Grubbs et al. |
| 7,951,875 | B2 | 5/2011 | Guerin et al. |
| 2002/0107138 | A1 | 8/2002 | Hoveyda et al. |
| 2003/0055262 | A1 | 3/2003 | Grubbs et al. |
| 2004/0127647 | A1 | 7/2004 | Ong et al. |
| 2004/0132891 | A1 | 7/2004 | Ong et al. |
| 2005/0027075 | A1* | 2/2005 | Guerin et al. .................. 525/191 |
| 2013/0165661 | A1 | 6/2013 | Grubbs et al. |

FOREIGN PATENT DOCUMENTS

GB    155849 A    3/1977

OTHER PUBLICATIONS

Mohr et al., Organomettalics, 1996, 15, 4317-4325.*
Geissler et al., Science 291, 2121 (2001).*
Roberts, K.S., "Increased Polymer Length of Oligopeptide-Substituted Polynorbornenes with LiC1", J. Org. Chem, 2003, 68, pp. 2020-2023.
Roberts, K.S. "Comparison of Fertilin-Peptide-Substituted Polymers and Liposomes as Inhibitors of In Vitro Fertilization", 2003, Wiley-VCH Verlag GmbH, pp. 1229-1231.
Dias, E. L., "Well Defined Ruthenium Olefin Metathesis Catalysts: Mechanism and Activity", J. Am. Chem. Soc. 1997, 119, pp. 3887-3897.
Schrock, R.R.,"Molybdenum and Tungsten Imido Alkylidene Complexes as Efficient Olefin-Metathesis Catalysts", Angew. Chem. Int. Ed. 2003, 42, pp. 4592-4633.
Grela, K., "A Good Bargain: An Inexpensive, Air-Stable Ruthenium Metathesis Catalyst Derived from a-Asarone", Eur. J. Org. Chem, 2003, pp. 963-966.
Grela, K., "A Highly Efficient Ruthenium Catalyst for Metathesis Reactions", Angew. Chem. Int. Ed., 2002, 41, No. 21, pp. 4038-4040.
Bujok, R., Ortho-and Para-Substituted Hoveyda-Grubbs Carbenes. "An Improved Synthesis of Highly Efficient Metathesis Initiators", J. Org. Chem. 2004, 69, pp. 6894-6896.
Krause, J., Synthesis and Reactivity of Homogeneous and Heterogeneous Ruthenium-Based Metathesis Catalyst Containing Electron-Withdrawing Ligands, Chem. Eur. J. 2004, 10, pp. 777-784.
Romero, P., "Rapidly Initiating Ruthenium Olefin-Metathesis Catalysts", Angew.Chem. Int. Ed., 2004, 43, pp. 6161-6165.
European Search Report from co-pending Application EP07002964 dated May 10, 2007 2 pages.

* cited by examiner

*Primary Examiner* — Karl J Puttlitz
(74) *Attorney, Agent, or Firm* — Jennifer R. Seng

(57) ABSTRACT

New catalyst systems for metathesis reactions, in particular for the metathesis of nitrile rubber, are provided.

6 Claims, No Drawings

PROCESS FOR REACTING CHEMICAL COMPOUNDS IN THE PRESENCE OF CATALYST SYSTEMS

CROSS REFERENCE

This application is a divisional of U.S. patent application Ser. No. 12/961,876 filed Dec. 7, 2010, pending, which is a divisional of U.S. patent application Ser. No. 11/707,420 filed Feb. 16, 2007, now abandoned, entitled "Process for Reacting Chemical Compounds In the Presence Of Catalyst Systems", and claims the right of priority of German patent application No. 102006008520.5 filed Feb. 22, 2006, the contents of which are hereby incorporated by reference in their entirety.

FIELD OF THE INVENTION

The present invention relates to novel catalyst systems and a method for reacting chemical compounds by subjecting such compounds to a metathesis reaction in the presence of said catalyst systems.

BACKGROUND OF THE INVENTION

Metathesis reactions are widely used for chemical syntheses, e.g. in the form of ring-closing metatheses (RCM), cross-metatheses (CM) or ring-opening metatheses (ROMP). Metathesis reactions are employed, for example, for the synthesis of olefins, for the depolymerization of unsaturated polymers and for the synthesis of telechelic polymers.

Metathesis catalysts are known, inter alia, from WO-A-96/04289 and WO-A-97/06185. They have the following in-principle structure:

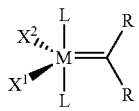

where M is osmium or ruthenium, the radicals R are identical or different organic radicals having a wide range of structural variation, $X^1$ and $X^2$ are anionic ligands and L are uncharged electron donors. The customary term "anionic ligands" is used in the literature regarding such metathesis catalysts to describe ligands which are always negatively charged with a closed electron shell when regarded separately from the metal centre.

Metathesis reactions have recently also become increasingly important for the degradation of nitrile rubbers.

Nitrile rubber, also referred to as "NBR" for short, is rubber which is a copolymer or terpolymer of at least one α,β-unsaturated nitrile, at least one conjugated diene and, if appropriate, one or more further copolymerizable monomers.

Hydrogenated nitrile rubber, also referred to as "HNBR" for short, is produced by hydrogenation of nitrile rubber. Accordingly, the C=C double bonds of the copolymerized diene units have been completely or partly hydrogenated in HNBR. The degree of hydrogenation of the copolymerized diene units is usually in the range from 50 to 100%.

Hydrogenated nitrile rubber is a specialty rubber which has very good heat resistance, an excellent resistance to ozone and chemicals and also an excellent oil resistance.

The abovementioned physical and chemical properties of HNBR are associated with very good mechanical properties, in particular a high abrasion resistance. For this reason, HNBR has found wide use in a variety of applications. HNBR is used, for example, for seals, hoses, belts and damping elements in the automobile sector, also for stators, oil well seals and valve seals in the field of oil extraction and also for numerous parts in the aircraft industry, the electronics industry, mechanical engineering and shipbuilding.

Commercially available HNBR grades usually have a Mooney viscosity (ML 1+4 at 100° C.) in the range from 55 to 105, which corresponds to a weight average molecular weight $M_w$ (method of determination: gel permeation chromatography (GPC) against polystyrene equivalents) in the range from about 200 000 to 500 000. The polydispersity index PDI (PDI=$M_w/M_n$, where $M_w$ is the weight average molecular weight and $M_n$ is the number average molecular weight), which gives information about the width of the molecular weight distribution, measured here is frequently 3 or above. The residual double bond content is usually in the range from 1 to 18% (determined by IR spectroscopy).

The processability of HNBR is subject to severe restrictions as a result of the relatively high Mooney viscosity. For many applications, it would be desirable to have an HNBR grade which has a lower molecular weight and thus a lower Mooney viscosity. This would decisively improve the processability.

Numerous attempts have been made in the past to shorten the chain length of HNBR by degradation. For example, the molecular weight can be decreased by thermomechanical treatment (mastication), e.g. on a roll mill or in a screw apparatus (EP-A-0 419 952). However, this thermomechanical degradation has the disadvantage that functional groups such as hydroxyl, keto, carboxyl and ester groups, are incorporated into the molecule as a result of partial oxidation and, in addition, the microstructure of the polymer is substantially altered.

The preparation of HNBR having low molar masses corresponding to a Mooney viscosity (ML 1+4 at 100° C.) in the range below 55 or a number average molecular weight of about $M_n$<200 000 g/mol was for a long time not possible by means of established production processes since, firstly, a step increase in the Mooney viscosity occurs in the hydrogenation of NBR and, secondly, the molar mass of the NBR feedstock used for the hydrogenation cannot be reduced at will since otherwise the work-up can no longer be carried out in the industrial plants available because the product is too sticky. The lowest Mooney viscosity of an NBR feedstock which can be processed without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML 1+4 at 100° C.). The Mooney viscosity is determined in accordance with ASTM standard D 1646.

In the more recent prior art, this problem is solved by reducing the molecular weight of the nitrile rubber prior to hydrogenation by degradation to a Mooney viscosity (ML 1+4 at 100° C.) of less than 30 Mooney units or a number average molecular weight of $M_n$<70 000 g/mol. The decrease in the molecular weight is achieved by metathesis in which low molecular weight 1-olefins are usually added. The metathesis of nitrile rubber is described, for example, in WO-A-02/100905, WO-A-02/100941 and WO-A-03/002613. The metathesis reaction is advantageously carried out in the same solvent as the hydrogenation reaction (in situ) so that the degraded nitrile rubber does not have to be isolated from the solvent after the degradation reaction is complete before it is subjected to the subsequent hydrogenation. Metathesis catalysts which have a tolerance towards polar groups, in particular towards nitrile groups, are used for catalyzing the metathetic degradation reaction.

WO-A-02/100905 and WO-A-02/100941 describe a process which comprises degradation of nitrile rubber starting polymers by olefin metathesis and subsequent hydrogenation to form HNBR having a low Mooney viscosity. Here, a nitrile rubber is reacted in a first step in the presence of a coolefin and specific catalysts based on osmium, ruthenium, molybdenum or tungsten complexes and hydrogenated in a second step. Hydrogenated nitrile rubbers having a weight average molecular weight ($M_w$) in the range from 30 000 to 250 000, a Mooney viscosity (ML 1+4 at 100° C.) in the range from 3 to 50 and a polydispersity index PDI of less than 2.5 can be obtained by this route.

The metathesis of nitrile rubber can be carried out using, for example, the catalyst bis(tricyclohexylphosphine)benzylideneruthenium dichloride shown below.

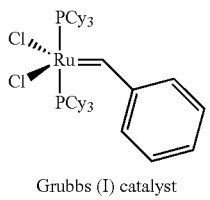

Grubbs (I) catalyst

After metathesis and hydrogenation, the nitrile rubbers have a lower molecular weight and also a narrower molecular weight distribution than the hydrogenated nitrile rubbers which have hitherto been able to be prepared according to the prior art.

However, the amounts of Grubbs (I) catalyst employed for carrying out the metathesis are large. In the experiments in WO-A-03/002613, they are, for example, 307 ppm and 61 ppm of Ru based on the nitrile rubber used. The reaction times necessary are also long and the molecular weights after the degradation are still relatively high (see Example 3 of WO-A-03/002613, in which $M_w$=180 000 g/mol and $M_n$=71 000 g/mol).

US 2004/0127647 A1 describes blends based on low molecular weight HNBR rubbers having a bimodal or multimodal molecular weight distribution and also vulcanizates of these rubbers. To carry out the metathesis, 0.5 phr of Grubbs I catalyst is used according to the examples. This corresponds to the large amount of 614 ppm of ruthenium based on the nitrile rubber used.

Furthermore, WO-A-00/71554 discloses a group of catalysts which are known in the technical field as "Grubbs (II) catalysts".

If such a "Grubbs(II) catalyst", e.g. the catalyst 1,3-bis(2, 4,6-trimethylphenyl)-2-imidazolidenylidene)(tricyclohexylphosphine)ruthenium(phenylmethylene) dichloride, is used for the metathesis of NBR (US-A-2004/0132891), this can be carried out successively even without the use of a coolefin.

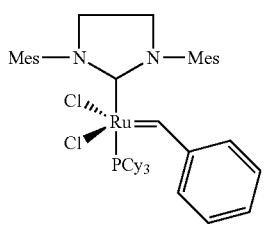

Grubbs (II) catalyst

After the subsequent hydrogenation, which is preferably carried out in situ, the hydrogenated nitrile rubber has lower molecular weights and a narrower molecular weight distribution (PDI) than when using catalysts of the Grubbs (I) type. In terms of the molecular weight and the molecular weight distribution, the metathetic degradation thus proceeds more efficiently when using catalysts of the Grubbs II type than when using catalysts of the Grubbs I type. However, the amounts of ruthenium necessary for this efficient metathetic degradation are still relatively high. Long reaction times are also still required for carrying out the metathesis using the Grubbs II catalyst.

In all the abovementioned processes for the metathetic degradation of nitrile rubber, relatively large amounts of catalyst have to be used and long reaction times are required in order to produce the desired low molecular weight nitrile rubbers by means of metathesis.

The activity of the catalysts used is also of critical importance in other types of metathesis reactions.

In J. Am. Chem. Soc. 1997, 119, 3887-3897, it is stated that in the ring-closing metathesis of diethyl diallylmalonate,

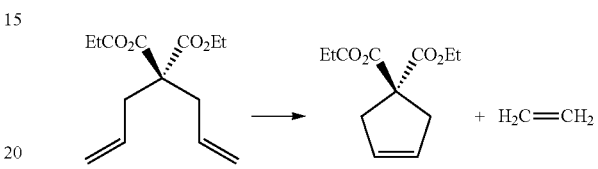

the activity of the catalysts of the Grubbs I type can be increased by additions of CuCl and $CuCl_2$. This increase in activity is explained by a shift in the dissociation equilibrium resulting from a phosphane ligand which is eliminated reacting with copper ions to form copper-phosphane complexes.

However, this increase in activity due to copper salts in the abovementioned ring-closing metathesis cannot be carried over to any desired other types of metathesis reactions. Our studies have unexpectedly shown that although the addition of copper salts leads to an initial acceleration of the metathesis reaction in the metathetic degradation of nitrile rubbers, a significant decrease in the efficiency of the metathesis is observed: the molecular weights which can ultimately be achieved for the degraded nitrile rubbers are substantially higher than when the metathesis reaction is carried out in the presence of the same catalyst but in the absence of the copper salts.

SUMMARY OF THE INVENTION

It was therefore an object of the invention to find universally usable catalyst systems which in each case have an increased activity when employed in the various types of metathesis reactions, in order thereby to reduce the amounts of catalyst necessary, in particular the amounts of noble metal present therein. For the metathetic degradation of nitrile rubber in particular, possible ways of making an increase in activity of the catalyst used possible without gelling of the nitrile rubber are to be found.

It has surprisingly been found that the activity of metathesis catalysts can be increased when they are used in combination with salts other than copper salts.

DETAILED DESCRIPTION OF THE INVENTION

The invention therefore provides a catalyst system comprising a metathesis catalyst and one or more salts of the general formula (I)

$$K^{n+}A^{z-} \qquad (I)$$

where
K is a cation with the exception of copper and
A is an anion,
where
n is 1, 2 or 3 and
z is 1, 2 or 3.

For the purposes of the present patent application and invention, all the definitions of radicals, parameters or explanations given above or below in general terms or in preferred ranges can be combined with one another in any way, i.e. including combinations of the respective ranges and preferred ranges.

The term "substituted" used for the purposes of the present patent application in respect of the metathesis catalyst or the salt of the general formula (I) means that a hydrogen atom on an indicated radical or atom has been replaced by one of the groups indicated in each case, with the proviso that the valence of the atom indicated is not exceeded and the substitution leads to a stable compound.

Suitable cations are based on elements from the Periodic Table (main groups and transition elements) which can form cations bearing one, two or three positive charges, with the exception of copper.

Suitable cations are, for example, lithium, sodium, potassium rubidium, caesium, francium, beryllium, magnesium, calcium, strontium, barium, aluminium, gallium, indium, thallium, germanium, tin, lead, arsenic, antimony, bismuth, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, silver, gold, zinc, cadmium, mercury and also all elements of the group of the rare earths, in particular cerium, praseodynium and neodymium, and the elements of the actinides.

Further suitable cations are complex cations based on nitrogen, phosphorus or sulphur. It is possible to use, for example, tetralkylammonium, tetraarylammonium, hydroxylammonium, tetraalkylphosphonium, tetraarylphosphonium, sulphonium, anilinium, pyridinium, imidazolium, guanidinium and hydrazinium cations and also cationic ethylenediamine derivatives.

The alkyl radicals in all the abovementioned complex cations can be identical or different and are usually each a straight-chain or branched $C_1$-$C_{30}$-alkyl radical, preferably a $C_1$-$C_{20}$-alkyl radical, particularly preferably a $C_1$-$C_{18}$-alkyl radical. These alkyl radicals can also be substituted by aryl radicals. $C_1$-$C_{18}$-Alkyl encompasses, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undexyl, n-dodecyl, n-tridecyl, n-tetradecyl, n-hexadecyl, n-octadecyl and benzyl.

The aryl radicals in all the abovementioned complex cations can likewise be identical or different and are usually each a $C_6$-$C_{24}$-aryl radical, preferably a $C_6$-$C_{14}$-aryl radical, particularly preferably a $C_6$-$C_{10}$-aryl radical. Examples of $C_6$-$C_{24}$-aryl are phenyl, o-, p-, m-tolyl, naphthyl, phenanthrenyl, anthracenyl and fluorenyl.

The sulphonium cations of the $[R_3S]^+$ type bear three identical or different radicals which can be aliphatic or aromatic in nature. These radicals can be alkyl or aryl radicals having the abovementioned general, preferred and particularly preferred meanings.

Particularly preferred complex cations are benzyldodecyldimethylammonium, didecyldimethylammonium, dimethylanilinium, N-alkyl-N,N-bis-(2-hydroxyalkyl)-N-benzylammonium, N,N,N-triethylbenzolmethanaminium, O-methyluronium, S-methyl-thiuronium, pyridinium, tetrabutylammonium, tetramethyluronium, tetracetylammonium, tetrabutylphosphonium, tetraphenylphosphonium, diphenylguanidinium, di-o-tolylguanidinium, butyldiphenylsulphonium, tributylsulphonium.

In the general formula (I), A is a singly, doubly, or triply charged anion, preferably from the group consisting of halides, pseudohalides, complex anions, anions of organic acids, aliphatic or aromatic sulphonates, aliphatic or aromatic sulphates, phosphonates, phosphates, thiophosphates, xanthogenates, dithiocarbamates and noncoordinating anions.

Preferred halides are fluoride, chloride, bromide, iodide.

Preferred pseudohalides are, for example triiodide, azide, cyanide, thiocyanide, thiocyanate and interhalides.

Suitable complex anions are, for example, sulphite, sulphate, dithionite, thiosulphate, carbonate, hydrogencarbonate, perthiocarbonate, nitrite, nitrate, perchlorate, tetrafluoroborate, tetrafluoroaluminate, hexafluorophosphate, hexafluoroarsenate, hexafluoroantimonate and hexachloroantimonate.

Preferred singly, doubly or triply charged anions of organic acids are singly, doubly or triply charged anions of organic carboxylic acids having from 1 to 20 carbon atoms. The organic carboxylic acids can be saturated or monounsaturated or polyunsaturated. Selected examples are formate, acetate, propionate, butyrate, oleate, palmitate, stearate, versatate, acrylate, methacrylate, crotonate, benzoate, naphthalenecarbonate, oxalate, salicylate, terephthalate, fumarate, maleate, itaconate and abietate.

Suitable aliphatic or aromatic sulphonates are anthraquinone-2-sulphonate, benzenesulphonate, benzene-1, 3-disulphonate, decane-1-sulphonate, hexadecane-1-sulphonate, hydroquinonemonosulphonate, methyl-4-toluenesulphonate, naphthalene-1-sulphonate, naphthalene-1,5-disulphonate, tosylate and mesylate.

Suitable aliphatic or aromatic sulphates are, for example, dodecylsulphate and alkylbenzenesulphates.

Suitable phosphonates, phosphates and thiophosphates are vinylphosphonate, ethylphosphonate, butylphosphonate, cetylphosphonate, dibutylphosphate, dioctylphosphate, dibutyldithiophosphate and dioctylthiophosphate.

Suitable aliphatic or aromatic xanthogenates are ethylxanthogenate, butylxanthogenate, phenylxanthogenate, benzylxanthogenate, etc.

Suitable aliphatic or aromatic dithiocarbamates are dimethyldithiocarbamate, diethyldithiocarbamate, dibutyldithiocarbamate and dibenzyldithiocarbamate.

Noncoordinating anions are, for example, tetrakis[pentafluorophenyl]borate, pentakis-[pentafluorophenyl]phosphate, tetrakis[3,5-trifluoromethylphenyl]borate, pentakis[3, 5-trifluoromethylphenyl]phosphate and pentakis [pentafluorophenyl]cyclohexadienyl anion.

For the purposes of the following definitions, all general or preferred or particularly preferred definitions of radicals, parameters or explanations mentioned for a particular catalyst type can be combined with one another in any way, i.e. including combinations of the respective ranges and preferred ranges of the catalyst types.

Suitable catalysts in the catalyst systems of the invention are compounds of the general formula (A)

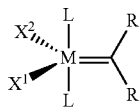
(A)

where
M is osmium or ruthenium,
the radicals R are identical or different and are each an alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl radical, each of which may optionally be substituted by one or more alkyl, halogen, alkoxy, aryl or heteroaryl radicals,
$X^1$ and $X^2$ are identical or different and are two ligands, preferably anionic ligands, and
L represents identical or different ligands, preferably uncharged electron donors.

In the catalysts of the general formula (A), $X^1$ and $X^2$ are identical or different and are two ligands, preferably anionic ligands.

$X^1$ and $X^2$ can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals may also in turn be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (A), L represents identical or different ligands, preferably uncharged electron donors.

The two ligands L can, for example, each be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_6$-$C_{24}$-arylphosphine, $C_1$-$C_5$-alkylphosphine or $C_3$-$C_{20}$-cycloalkylphosphine ligand, a sulphonated $C_6$-$C_{24}$-arylphosphine or $C_1$-$C_{10}$-alkylphosphine ligand, a $C_6$-$C_{24}$-aryl phosphinite or $C_1$-$C_{10}$-alkyl phosphinite ligand, a $C_6$-$C_{24}$-aryl phosphonite or $C_1$-$C_{10}$-alkyl phosphonite ligand, a $C_6$-$C_{24}$-aryl phosphite or $C_1$-$C_{10}$-alkylphosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which may in turn be substituted by a halogen, $C_1$-$C_5$ alkyl radical or $C_1$-$C_5$-alkoxy radical.

The term phosphine includes, for example, $PPh_3$, P(p-Tol)$_3$, P(o-Tol)$_3$, $PPh(CH_3)_2$, $P(CF_3)_3$, $P(p-FC_6H_4)_3$, $P(p-CF_3C_6H_4)_3$, $P(C_6H_4$—$SO_3Na)_3$, $P(CH_2C_6H_4$—$SO_3Na)_3$, P(iso-Pr)$_3$, $P(CHCH_3(CH_2CH_3))_3$, P(cyclopentyl)$_3$, P(cyclohexyl)$_3$, P(neopentyl)$_3$ and P(neophenyl)$_3$.

Phosphinite includes, for example, triphenyl phosphinite, tricyclohexyl phosphinite, triisopropyl phosphinite and methyl diphenylphosphinite.

Phosphite includes, for example, triphenyl phosphite, tricyclohexyl phosphite, tri-tert-butyl phosphite, triisopropyl phosphite and methyl diphenyl phosphate.

Stibine includes, for example, triphenylstibine, tricyclohexylstibine and trimethylstibene.

Sulphonate includes, for example, trifluoromethanesulphonate, tosylate and mesylate. Sulphoxide includes, for example, $CH_3S(=O)CH_3$ and $(C_6H_5)_2SO$.

Thioether includes, for example, $CH_3SCH_3$, $C_6H_5SCH_3$, $CH_3OCH_2CH_2SCH_3$ and tetrahydrothiophene.

The imidazolidine radical (Im) usually has a structure of the general formula (IIa) or (IIb),

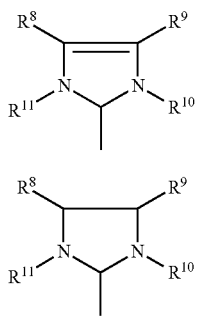

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$arylthio, $C_1$-$C_{20}$-alkylsulphonyl, $C_1$-$C_{20}$-alkylsulphonate, $C_8$-$C_{20}$-arylsulphonate or $C_1$-$C_{20}$alkylsulphinyl.

If desired, one or more of the radicals $R^8$, $R^9$, $R^{10}$, $R^{11}$ can, independently of one another, be substituted by one or more substituents, preferably straight-chain or branched $C_1$-$C_{10}$-alkyl, $C_3$-$C_8$-cycloalkyl, $C_1$-$C_{10}$alkoxy or $C_6$-$C_{24}$-aryl, with these abovementioned substituents in turn being able to be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the novel catalysts of the general formula (A), $R^8$ and $R^9$ are each, independently of one another, hydrogen, $C_5$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In a preferred embodiment of the novel catalysts of the general formula (B), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_8$-$C_{10}$-arylsulphonate, particularly preferably p-toluenesulphonate.

Radicals $R^{19}$ and $R^{11}$ of the abovementioned type may optionally be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals $R^{10}$ and $R^{11}$ may be identical or different and are each i-propyl, neopentyl, adamantyl or mesityl.

A variety of representatives of the catalysts of the formula (A) are known in principle, e.g. from WO-A-96/04289 and WO-A-97/06185.

Particular preference is given to both ligands L in the general formula (A) being identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one ligand L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Two catalysts which are preferred for the catalyst system of the invention and come under the general formula (A) have the structures (III) (Grubbs (I) catalyst) and (IV) (Grubbs (II) catalyst), where Cy is cyclohexyl.

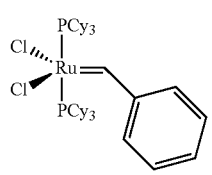

(III)

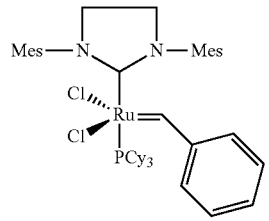

(IV)

Further suitable metathesis catalysts in the catalyst systems of the invention are catalysts of the general formula (B),

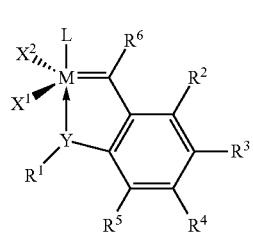

(B)

where
M is ruthenium or osmium,
Y is oxygen (O), sulphur (S), an N—$R^1$ radical or a P—$R^1$ radical, where $R^1$ is as defined below,
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical, each of which may optionally be substituted by one or more alkyl, halogen, alkoxy, aryl or heteroaryl radicals,
$R^2$, $R^3$, $R^4$ and $R^5$ are identical or different and are each hydrogen, organic or inorganic radicals,
$R^6$ is hydrogen or an alkyl, alkenyl, alkynyl or aryl radical and L is a ligand which has the same meanings given for the formula (A).

The catalysts of the general formula (B) are known in principle. Representatives of this class of compounds are the catalysts described by Hoveyda et al. in US 2002/01 071 38 A1 and Angew Chem. Int. Ed. 2003, 42, 4592, and the catalysts described by Grela in WO-A-2004/035596, Eur. J. Org. Chem. 2003, 963-966 and Angew. Chem. Int. Ed. 2002, 41, 4038 and in J. Org. Chem. 2004, 69, 6894-96 and Chem. Eur. J. 2004, 10, 777-784. The catalysts are commercially available or can be prepared as described in the references cited.

In the catalysts of the general formula (B), L is a ligand which usually has an electron donor function and can have the same general, preferred and particularly preferred meanings as L in the general formula (A).

Furthermore, L in the general formula (B) is preferably a P($R^7$)$_3$ radical, where the radicals $R^7$ are each, independently of one another, $C_1$-$C_8$-alkyl, $C_3$-$C_8$-cycloalkyl or aryl or else a substituted or unsubstituted imidazolidine radical ("Im").

$C_1$-$C_6$-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-Cycloalkyl encompasses cyclopropyl, cyclobutyl, cyclopentyl, cyclohexyl, cycloheptyl and cyclooctyl.

Aryl encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

The imidazolidine radical (Im) usually has a structure of the general formula (IIa) or (IIb),

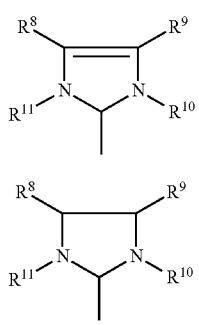

(IIa)

(IIb)

where
$R^8, R^9, R^{10}, R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_8$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_8$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

One or more of the radicals $R^8, R^9, R^{10}, R^{11}$ may, independently of one another, optionally be substituted by one or more substituents, preferably straight-chain or branched $C_1$-$C_{10}$-alkyl, $C_3$-$C_8$-cycloalkyl, $C_1$-$C_{10}$alkoxy or $C_8$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the novel catalysts of the general formula (B), $R^8$ and $R^9$ are each, independently of one another, hydrogen, $C_8$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_8$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In a preferred embodiment of the novel catalysts of the general formula (B), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_8$-$C_{24}$-aryl, particularly preferably phenyl, $C_1$-$C_{10}$-alkylsulphonate, particularly preferably methanesulphonate, $C_8$-$C_{10}$-arylsulphonate, particularly preferably p-toluenesulphonate.

Radicals $R^{10}$ and $R^{11}$ of the abovementioned type may optionally be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals $R^{10}$ and $R^{11}$ may be identical or different and are each i-propyl, neopentyl, adamantyl or mesityl.

Particularly preferred imidazolidine radicals (Im) have the following structures (Va-f), where Mes is in each case a 2,4,6-trimethylphenyl radical.

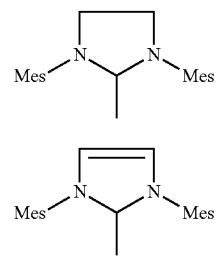

(Va)

(Vb)

(Vc)

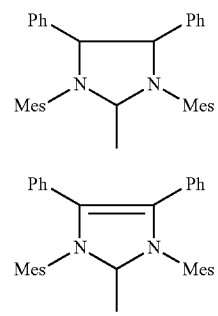

(Vd)

(Ve)

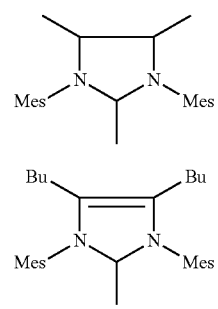

(Vf)

In the catalysts of the general formula (B), $X^1$ and $X^2$ are identical or different and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthio, $C_5$-$C_{24}$-arylthio, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$alkyl, $C_1$-$C_{10}$-alkoxy or $C_6$-$C_{24}$-aryl radicals, where the latter radicals may also in turn be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, each of which may optionally be substituted by one or more alkyl, halogen, alkoxy, aryl or heteroaryl radicals.

$R^1$ is preferably a $C_3$-$C_{20}$-cylcoalkyl radical, a $C_6$-$C_{24}$-aryl radical or a straight-chain or branched $C_1$-$C_{30}$-alkyl radical, with the latter optionally being able to be interrupted by one or more double or triple bonds or one or more heteroatoms, preferably oxygen or nitrogen. $R^1$ is particularly preferably a straight-chain or branched $C_1$-$C_{12}$-alkyl radical.

The $C_3$-$C_{20}$-cycloalkyl radical encompasses, for example, cyclopropyl, cyclobutyl, cyclopentyl, cyclohexyl, cycloheptyl and cyclooctyl.

The $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

The $C_6$-$C_{24}$-aryl radical is an aromatic radical having from 56 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (B), the radicals $R^2$, $R^3$, $R^4$ and $R^5$ are identical or different and can be hydrogen, organic or inorganic radicals.

In a preferred embodiment, $R^2$, $R^3$, $R^4$, $R^5$ are identical or different and are each hydrogen, halogen, nitro, $CF_3$ or an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$ or a $C_1$-$C_{30}$-alkyl, $C_3$-$C_{20}$-cylcoalkyl, $C_2$-$C_{20}$-alkenyl, $C_2$-$C_{20}$-alkynyl, $C_5$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, each of which may optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, a straight-chain or branched $C_1$-$C_{30}$-alkyl, $C_5$-$C_{20}$-cycloalkyl, straight-chain or branched $C_1$-$C_{20}$-alkoxy radical or a $C_6$-$C_{24}$-aryl radical, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ can, with inclusion of the carbon atoms to which they are bound in the phenyl ring of the formula (B), form a fused-on phenyl ring so that overall a naphthyl structure results.

In the general formula (B), $R^6$ is hydrogen or an alkyl, alkenyl, alkynyl or aryl radical. $R^6$ is preferably hydrogen or a $C_1$-$C_{30}$-alkyl, $C_2$-$C_{20}$-alkenyl, $C_2$-$C_{20}$-alkynyl or $C_6$-$C_{24}$-aryl radical. $R^6$ is particularly preferably hydrogen.

Particularly suitable catalysts for the catalyst system of the invention are catalysts of the general formula (B1)

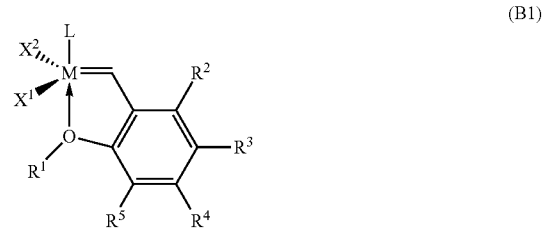

(B1)

where
M, L, $X^1$, $X^2$, $R^1$, $R^2$, $R^3$, $R^4$ and $R^5$ can have the general, preferred and particularly preferred meanings given for the general formula (B).

These catalysts are known in principle, for example from US 2002/0107138 A1 (Hoveyda et al.), and can be obtained by preparative methods indicated there.

Particular preference is given to catalysts of the general formula (B1) in which
M is ruthenium,
$X^1$ and $X^2$ are both halogen, in particular, both chlorine,
$R^1$ is a straight-chain or branched $C_1$-$C_{12}$-alkyl radical,
$R^2$, $R^3$, $R^4$, $R^5$ have the general and preferred meanings given for the general formula (B) and
L has the general and preferred meanings given for the general formula (B).

Very particular preference is given to catalysts of the general formula (B1) in which
M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formula (IIa) or (IIb),

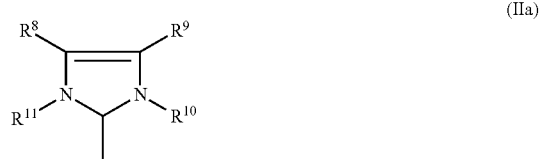

(IIa)

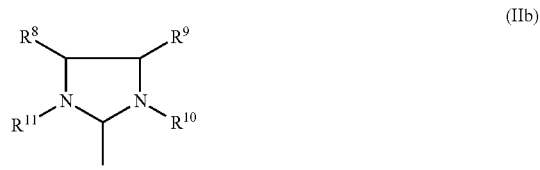

(IIb)

where

R[8]R[9], R[10], R[11] are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

As catalyst coming under the general structural formula (B1) for the catalyst systems of the invention, especial preference is given to those of the formula (VI), where Mes is in each case a 2,4,6-trimethylphenyl radical.

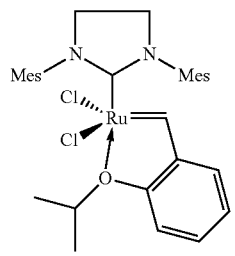

(VI)

This catalyst is also referred to in the literature as "Hoveyda catalyst".

Further suitable catalysts which come under the general structural formula (B1) are those of the following formulae (VII), (VIII), (IX), (X), (XI), (XII), (XIII) and (XVII), where Mes is in each case a 2,4,6-trimethylphenyl radical.

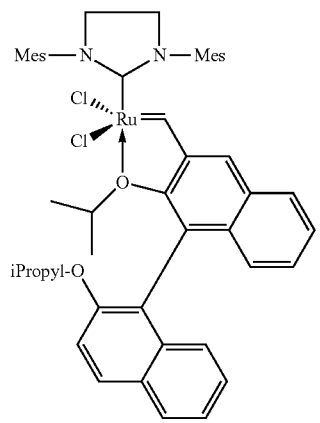

(VII)

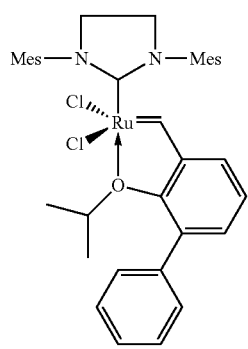

(VIII)

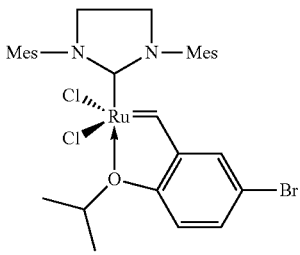

(IX)

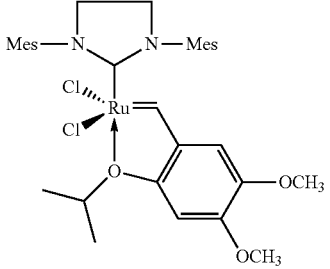

(X)

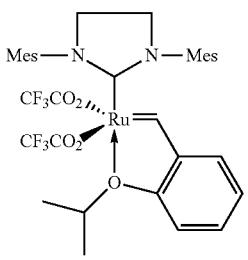

(XI)

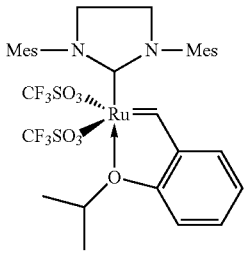

(XII)

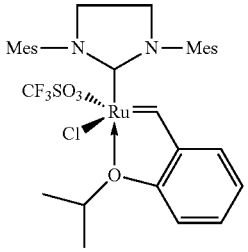

(XIII)

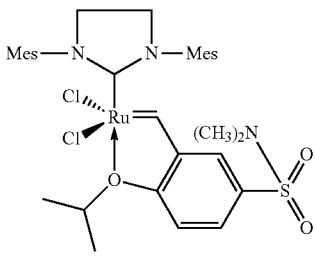

(XVII)

Further suitable catalysts for the catalyst system of the invention are catalysts of the general formula (B2)

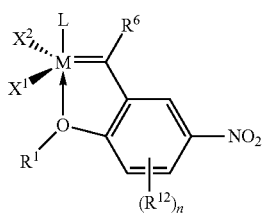

(B2)

where
M, L, $X^1$, $X^2$, $R^1$ and $R^6$ have the general and preferred meanings given for the formula (B),
$R^{12}$ are identical or different and have the general and preferred meanings given for the radicals $R^2$, $R^3$, $R^4$ and $R^5$ in the formula (B), with the exception of hydrogen, and
n is 0, 1, 2 or 3.

These catalysts are known in principle, for example from WO-A-2004/035596 (Greta), and can be obtained by the preparative methods indicated there.

Particular preference is given to catalysts of the general formula (B2) in which
M is ruthenium,
$X^1$ and $X^2$ are both halogen, in particular both chlorine,
$R^1$ is a straight-chain or branched $C_1$-$C_{12}$-alkyl radical,
$R^{12}$ has the meanings given for the general formula (B),
n is 0, 1, 2 or 3,
$R^6$ is hydrogen and
L has the meanings given for the general formula (B).

Very particular preference is given to catalysts of the general formula (B2) in which
M is ruthenium,
$X^1$ and $X^2$ are both chlorine,
$R^1$ is an isopropyl radical,
n is 0 and
L is a substituted or unsubstituted imidazolidine radical of the formula (IIa) or (IIb),

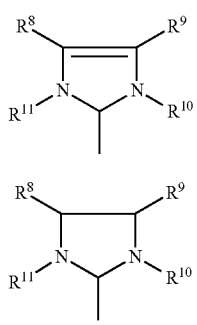

(IIa)

(IIb)

where
$R^8$, $R^9$, $R^{10}$, $R^{11}$ are identical or different and are each hydrogen, straight-chain or branched, cyclic or acyclic $C_1$-$C_{30}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

A particularly suitable catalyst which comes under the general formula (B2) has the structure (XIV)

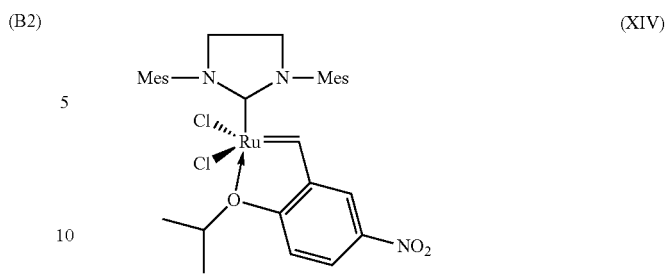

(XIV)

and is also referred to in the literature as "Grela catalyst".

A further suitable catalyst which comes under the general formula (B2) has the structure (XV), where Mes is in each case a 2,4,6-trimethylphenyl radical.

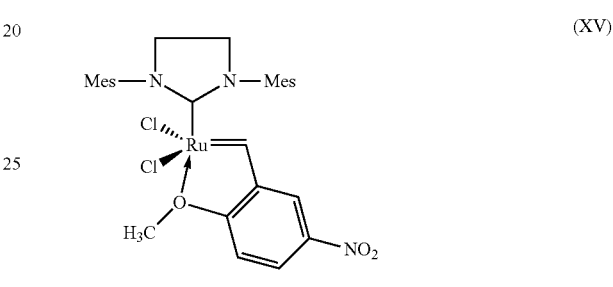

(XV)

In an alternative embodiment, it is also possible to use dendritic catalysts of the general formula (B3),

(B3)

where $D^1$, $D^2$, $D^3$ and $D^4$ each have a structure of the general formula (XVI) below which is bound via the methylene group to the silicon of the formula (B3),

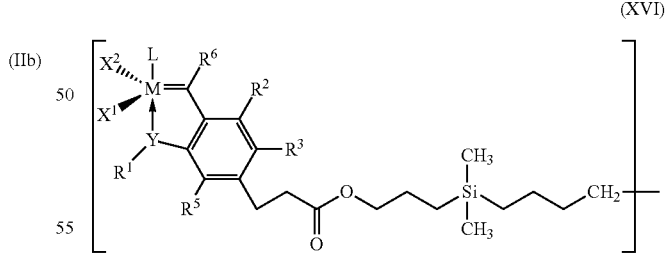

(XVI)

where
M, L, $X^1$, $X^2$, $R^1$, $R^2$, $R^3$, $R^5$ and $R^6$ have the meanings given for the general formula (B) and can also have the above-mentioned preferred meanings.

Such catalysts of the general formula (B3) are known from US 2002/0107138 A1 and can be prepared according to the information given there.

In a further alternative embodiment, it is possible to use a catalyst of the formula (B4),

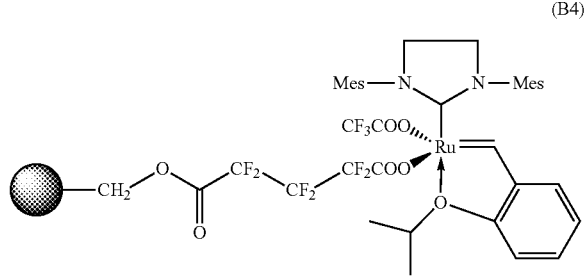

(B4)

where the symbol

represents a support.

The support is preferably a poly(styrene-divinylbenzene) copolymer (PS-DVB).

These catalysts of the formula (B4) are known in principle from Chem. Eur. J. 2004 10, 777-784 and can be obtained by the preparative methods described there.

All the abovementioned catalysts of the type (B) can either be used as such in the reaction mixture of the NBR metathesis or can be applied to and immobilized on a solid support. As solid phases or supports, it is possible to use materials which firstly are inert towards the reaction mixture of the metathesis and secondly do not impair the activity of the catalyst. It is possible to use, for example, metals, glass, polymers, ceramic, organic polymer spheres or inorganic sol-gels for immobilizing the catalyst.

The catalyst system of the invention can also be prepared using catalysts of the general formula (C),

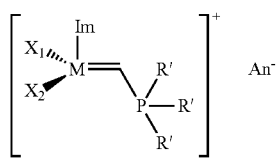

(C)

where
M is ruthenium or osmium,
$X^1$ and $X^2$ can be identical or different and are anionic ligands,
the radicals R' are identical or different and are organic radicals,
Im is a substituted or unsubstituted imidazolidine radical and
An is an anion.

These catalysts are known in principle (cf., for example, Angew. Chem. Int. Ed. 2004, 43, 6161-6165).

$X^1$ and $X^2$ in the general formula (C) can have the same general, preferred and particularly preferred meanings as in the formula (B).

The imidazolidine radical (Im) usually has a structure of the general formula (IIa) or (IIb) which have already been mentioned for the catalyst type of the formulae (A) and (B) and can also have all the structures mentioned there as preferred, in particular those of the formulae (Va)-(Vf).

The radicals R' in the general formula (C) are identical or different and are each a straight-chain or branched $C_1$-$C_{30}$-alkyl, $C_5$-$C_{30}$-cylcoalkyl or aryl radical, with the $C_1$-$C_{30}$-alkyl radicals optionally being able to be interrupted by one or more double or triple bonds or one or more heteroatoms, preferably oxygen or nitrogen.

Aryl encompasses an aromatic radical having from 5 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The radicals R' in the general formula (C) are preferably identical and are each phenyl, cyclohexyl, cyclopentyl, isopropyl, o-tolyl, o-xylyl or mesityl.

Further suitable catalysts for the catalyst systems of the invention are catalysts of the general formula (D),

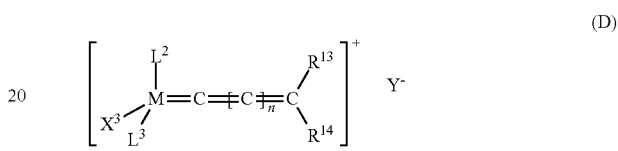

(D)

where
M is ruthenium or osmium,
$R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
$X^3$ is an anionic ligand,
$L^2$ is an uncharged π-bonded ligand, regardless of whether it is monocyclic or polycyclic,
$L^3$ is a ligand from the group of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphine amines, arsines, stibines, ethers, amines, amides, imines, sulphoxides, thioethers and pyridines,
$Y^-$ is a noncoordinating anion and
n is 0, 1, 2, 3, 4 or 5.

Further suitable catalysts for use in the catalyst systems of the invention are catalysts of the general formula (E)

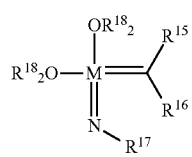

(E)

where
$M^2$ is molybdenum or tungsten,
$R^{15}$ and $R^{16}$ are identical or different and are each hydrogen, $C_1$-$C_{20}$-alkyl. $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
$R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof.

Further suitable catalysts for use in the catalyst systems of the invention are catalysts of the general formula (F),

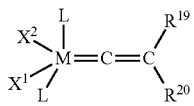 (F)

where
M is ruthenium or osmium,
$X^1$ and $X^2$ are identical or different and are anionic ligands which can assume all the meanings of $X^1$ and $X^2$ in the general formulae (A) and (B),
L are identical or different ligands which can assume all the general and preferred meanings of L in the general formulae (A) and (B),
$R^{19}$ and $R^{20}$ are identical or different and are each hydrogen or substituted or unsubstituted alkyl.

The catalyst systems of the invention thus comprise the metathesis catalyst and one or more salts of the general formula (I).

The invention further provides for a process of reacting a chemical compound comprising subjecting said chemical compound to a metathesis reaction in the presence of the aforementioned catalyst systems.

The metathesis reactions can be ring-closing metatheses (RCM), cross-metatheses (CM) or ring-opening metatheses (ROMP).

The catalyst systems of the invention are preferably used for the metathesis of nitrile rubber. This is a cross-metathesis.

In the catalyst system of the invention, the metathesis catalyst and the salt or salts of the general formula (I) is/are used in a weight ratio of salt(s):metathesis catalyst of from 0.01:1 to 10000:1, preferably from 0.1:1 to 1000:1, particularly preferably from 0.5:1 to 500:1.

The salt or salts of the general formula (I) can be added in a solvent or without solvent to the metathesis catalyst or its solution in order to obtain the catalyst system of the invention.

As solvent or dispersion medium in which the salt or salts of the general formula (I) is/are added to the catalyst or its solution, it is possible to use all known solvents. For the addition of the salt to be effective, it is not absolutely necessary for the salt to have a high solubility in the solvent. Preferred solvents include but are not restricted to acetone, benzene, chlorobenzene, chloroform, cyclohexane, dichloromethane, dioxane, dimethylformamide, dimethylacetamide, dimethyl sulphone, dimethyl sulphoxide, methyl ethyl ketone, tetrahydrofuran, tetrahydropyran and toluene. The solvent is preferably inert towards the metathesis catalyst.

If the catalyst systems of the invention are used for the metathesis of nitrile rubber, the amount in which the salt or salts of the general formula (I) is or are used is, based on the rubber to be degraded, in the range from 0.0001 phr to 50 phr, preferably from 0.001 phr to 35 phr (phr parts by weight per 100 parts by weight of rubber).

For the use for the NBR metathesis, too, the salt or salts of the general formula (I) can be added in a solvent or without solvent to a solution of the metathesis catalyst. As an alternative thereto, it is also possible to add the salt or salts of the general formula (I) directly to a solution of the nitrile rubber to be degraded to which the metathesis catalyst is also added, so that the entire catalyst system according to the invention is present in the reaction mixture.

The amount of metathesis catalyst based on the nitrile rubber used depends on the nature and the catalytic activity of the specific catalyst. The amount of catalyst used is usually from 1 to 1000 ppm of noble metal, preferably from 2 to 500 ppm, in particular from 5 to 250 ppm, based on the nitrile rubber used.

The NBR metathesis can be carried out in the absence or presence of a coolefin. This is preferably a straight-chain or branched $C_2$-$C_{16}$-olefin. Suitable coolefins are, for example, ethylene, propylene, isobutene, styrene, 1-hexene and 1-octene. Preference is given to using 1-hexene or 1-octene. If the coolefin is liquid (as in the case of, for example, 1-hexene), the amount of coolefin is preferably in the range 0.2-20% by weight based on the NBR used. If the coolefin is a gas, as in the case of, for example, ethylene, the amount of coolefin is selected so that a pressure in the range $1\times10^5$ Pa–$1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not adversely affect the reaction in any other way. Preferred solvents include, but are not restricted to, dichloromethane, benzene, toluene, methyl ethyl ketone, acetone, tetrahydrofuran, tetrahydropyran, dioxane and cyclohexane. The particularly preferred solvent is chlorobenzene. In some cases, when the coolefin itself can function as solvent, e.g. in the case of 1-hexene, the addition of a further additional solvent can also be omitted.

The concentration of the nitrile rubber used in the reaction mixture of the metathesis is not critical, but care naturally has to be taken to ensure that the reaction is not adversely affected by an excessively high viscosity of the reaction mixture and the mixing problems associated therewith. The concentration of NBR in the reaction mixture is preferably in the range from 1 to 20% by weight, particularly preferably in the range from 5 to 15% by weight, based on the total reaction mixture.

The metathetic degradation is usually carried out at a temperature in the range from 10° C. to 150° C., preferably at a temperature in the range from 20 to 100° C.

The reaction time depends on a number of factors, for example, on the type of NBR, the type of catalyst, the catalyst concentration used and the reaction temperature. The reaction is typically complete within three hours under normal conditions. The progress of the metathesis can be monitored by standard analytical methods, e.g. by GPC measurement or by determination of the viscosity.

As nitrile rubbers ("NBR"), it is possible to use copolymers or terpolymers which comprise repeating units of at least one conjugated diene, at least one α,β-unsaturated nitrile and, if desired, one or more further copolymerizable monomers in the metathesis reaction.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the α,β-unsaturated nitrile, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of or of the sum of the conjugated dienes is usually in the range from 40 to 90% by weight, preferably in the range from 60 to 85% by weight, based on the total polymer. The proportion of or of the sum of the α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrite or nitriles are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

The nitrite rubbers used for the metathesis have a Mooney viscosity (ML 1+4 at 100° C.) in the range from 30 to 70, preferably from 30 to 50. This corresponds to a weight average molecular weight $M_w$ in the range 200 000-500 000, preferably in the range 200 000-400 000. The nitrile rubbers used also have a polydispersity $PDI=M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D 1646.

The nitrile rubbers obtained by the metathesis process according to the invention have a Mooney viscosity (ML 1+4 at 100° C.) in the range 5 30, preferably 5-20. This corresponds to a weight average molecular weight $M_w$ in the range 10 000-200 000, preferably in the range 10 000 150 000. The nitrile rubbers obtained also have a polydispersity $PDI=M_w/M_n$, where $M_n$ is the number average molecular weight, in the range 1.5-4.0, preferably in the range 1.7-3.

The metathetic degradation in the presence of the catalyst system of the invention can be followed by a hydrogenation of the degraded nitrile rubbers obtained. This can be carried out in the manner known to those skilled in the art.

It is possible to carry out the hydrogenation with use of homogeneous or heterogeneous hydrogenation catalysts. It is also possible to carry out the hydrogenation in situ, i.e. in the same reaction vessel in which the metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula

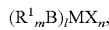

$(R^1{}_mB)_l MX_n,$ where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3$ $P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a cocatalyst which is a ligand of the formula $R^1{}_mB$, where $R^1$, m and B have the meanings given above for the catalyst. Preference is given to m being 3, B being phosphorus and the radicals $R^1$ can be identical or different. Preference is given to cocatalysts having trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of cocatalysts may be found in, for example, U.S. Pat. No. 4,631,315. A preferred cocatalyst is triphenylphosphine. The cocatalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight of cocatalyst, per 100 parts by weight of the nitrile rubber to be hydrogenated.

The practical implementation of this hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

After conclusion of the hydrogenation, a hydrogenated nitrile rubber having a Mooney viscosity (ML 1+4 at 100° C.), measured in accordance with ASTM standard D 1646, in the range 10-50, preferably from 10 to 30, is obtained. This corresponds to a weight average molecular weight $M_w$ in the range 2000-400 000 g/mol, preferably in the range 20 000-200 000. The hydrogenated nitrile rubbers obtained also have a polydispersity $PDI=M_w/M_n$, where $M_w$ is the weight average molecular weight and $M_n$ is the number average molecular weight, in the range 1-5 and preferably in the range 1.5-3.

The negative effect observed when using copper salts in the nitrile rubber metathesis surprisingly does not occur when salts of the general formula (I) are used.

However, the catalyst system of the invention can not only be used successfully for the metathetic degradation of nitrile rubbers but can also be used universally for other metathesis reactions, e.g. for ring-closing metatheses such as the ring closure of diethyl diallyl malonate.

As a result of the use of the novel catalyst systems comprising catalyst and one or more salts of the general formula (I), the amount of the metathesis catalyst and thus the amount of noble metal can be significantly reduced at comparable reaction times compared to analogous metathesis reactions in which only the catalyst, i.e. without salts, is used. When comparable noble metal contents are used, the reaction times are substantially shortened by the salt additions. When the catalyst systems are used for the degradation of nitrile rubbers, degraded nitrile rubbers having significantly lower molecular weights $M_w$ and $M_n$ can be obtained.

EXAMPLES

The following experiments show that the activity of the catalyst can be increased when it is used in combination with salt additions.

The following catalysts were used for this purpose:

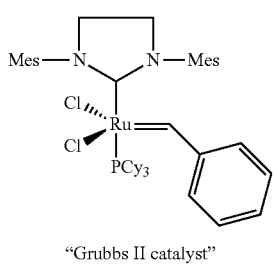

"Grubbs II catalyst"

The Grubbs II catalyst was procured from Materia (Pasadena/Calif.).

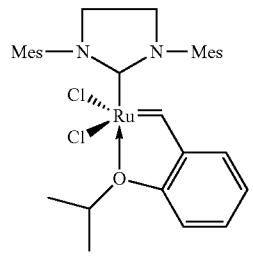

"Hoveyda catalyst"

The Hoveyda catalyst was procured from Aldrich under the product number 569755.

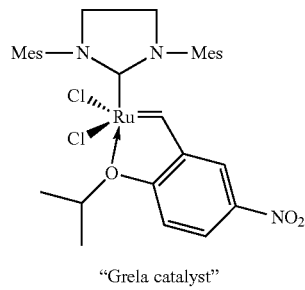

"Grela catalyst"

The Grela catalyst was prepared by the method published in J. Org. Chem. 2004, 69, 6894-6896.

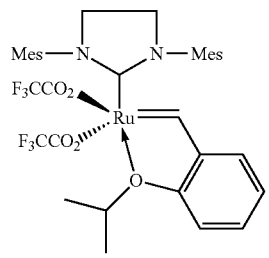

"Buchmeiser Nuyken catalyst"

The Buchmeiser Nuyken catalyst was prepared as described in Chemistry European Journal 2004, 10(3), 777-785.

General Method for the Metathetic Degradation of Nitrile Rubber ("NBR")

The degradation reactions described below in the trials 1 to 6 were carried out using the nitrile rubber Perbunan® NT 3435 from Lanxess Deutschland GmbH. This nitrile rubber had the following characteristic properties:

| | |
|---|---|
| Acrylonitrile content: | 35% by weight |
| Mooney viscosity (ML 1 + 4 @ 100° C.): | 34 Mooney units |
| Residual moisture content: | 1.8% by weight |
| $M_w$: | 240 000 g/mol |
| $M_n$: | 100 000 g/mol |
| PDI ($M_w/M_n$): | 2.4 |

The metathetic degradation was in each case carried out using 293.3 g of chlorobenzene (herein after referred to as "MCB"/from Aldrich) which had been distilled and made inert by passing argon through it at room temperature before use. 40 g of NBR were dissolved therein at room temperature over a period of 10 hours. 0.8 g (2 phr) of 1-hexene was in each case added to the NBR-containing solution and the mixture was stirred for 30 minutes to homogenize it.

The metathesis reaction was carried out at room temperature using the amounts of starting materials indicated below in Table 1. The Ru catalysts were in each case dissolved in 20 g of MCB at room temperature under argon. The addition of the catalyst solutions to the NBR solutions in MCB was carried out immediately after the preparation of the catalyst solutions. After the reaction times indicated below in Table 2, about 5 ml were in each case taken from the reaction solutions and immediately admixed with about 0.2 ml of ethyl vinyl ether to stop the reaction and subsequently dilute it with 5 ml of DMAc (N,N-dimethylacetamide) from Aldrich. 2 ml of the solutions were in each case placed in a GPC bottle and diluted with DMAc to 3 ml. Before carrying out the GPC analysis, the solutions were in each case filtered by means of a 0.2 μm syringe filter made of Teflon (Chromafil PTFE 0.2 μm; from Machery-Nagel). The GPC analysis was subsequently carried out using a Waters instrument (Mod. 510). The analysis was carried out using a combination of 4 columns from Polymer Laboratories: 1) PLgel 5 μm Mixed-C, 300×7.5 mm, 2) PLgel 5 μm Mixed-C, 300×7.5 mm, 3) PLgel 3 μm Mixed-E, 300× 7.5 mm, and 4) PLgel 3 μm Mixed-E, 300×7.5 mm.

The calibration of the GPC columns was carried out using linear poly(methyl methacrylate) from Polymer Standards Services. An RI detector from Waters (Waters 410) was used as detector. The analysis was carried out at a flow rate of 0.5 ml/min using DMAc as eluent. The GPC curves were evaluated using software from Millenium.

The following characteristic properties were determined by means of GPC analysis both for the original NBR rubber (before degradation) and for the degraded nitrile rubbers:
$M_w$ [kg/mol]: weight average molar mass
$M_n$ [kg/mol]: number average molar mass
PDI: width of the molar mass distribution ($M_w/M_n$)

TABLE 1

| Trial | Catalyst | Salt Type | Amount [phr] | Solvent |
|---|---|---|---|---|
| 1.01 | Grubbs (II) | — | — | — |
| 1.02 | Grubbs (II) | LiBr | 0.023 | DMAC |
| 1.03 | Grubbs (II) | LiBr | 0.00475 | DMAC |
| 1.04 | Grubbs (II) | LiBr | 0.5 | — |
| 1.05 | Grubbs (II) | LiBr | 5.08 | — |
| 1.06 | Grubbs (II) | CsBr | 12.45 | — |
| 1.07 | Grubbs (II) | LiCl | 2.55 | — |
| 1.08 | Grubbs (II) | [Bu$_4$N]$^+$Cl$^-$ | 16.25 | — |
| 1.09 | Grubbs (II) | [Bu$_4$N]$^+$Br$^-$ | 18.85 | — |
| 1.10 | Grubbs (II) | [Bu$_4$N]$^+$J$^-$ | 21.60 | — |
| 1.11. | Grubbs (II) | [Bu$_4$P]$^+$Cl$^-$ | 17.23 | — |
| 1.12. | Grubbs (II) | [Bu$_4$P]$^+$Br$^-$ | 19.85 | — |
| 1.13 | Grubbs (II) | [Ph$_4$P]$^+$Br$^-$ | 24.53 | — |
| 1.14 | Grubbs (II) | [Oc$_4$P]$^+$Br$^-$ | 32.98 | — |
| 1.15 | Grubbs (II) | [Bu$_4$N]$^+$SCN$^-$ | 17.58 | — |
| 1.16 | Grubbs (II) | [Oc$_4$N]$^+$Cl$^-$ | 2.93 | — |
| 1.17 | Grubbs (II) | Na$_2$SO$_4$ | 8.30 | — |
| 1.18 | Grubbs (II) | LiNO$_3$ | 4.03 | — |
| 1.19 | Grubbs (II) | NaNO$_2$ | 4.03 | — |
| 2.01 | Hoveyda | — | — | — |
| 2.02 | Hoveyda | LiBr | 5.08 | — |
| 3.01 | Buchmeiser-Nuyken | — | — | — |
| 3.02 | Buchmeiser-Nuyken | LiBr | 5.08 | — |
| 4.01 | Grela | — | — | — |
| 4.02 | Grela | LiBr | 5.08 | — |
| 5.01 | Hoveyda | — | — | — |
| 5.02 | Hoveyda | CuCl | 2.32 | — |
| 6.01 | Grela | — | — | — |
| 6.02 | Grela | CuCl | 2.32 | — |

1.00. Salt Additions when Using the Grubbs U Catalyst 1.01. Comparative Experiment: Grubbs II Catalyst without Salt Addition

| Grubbs II catalyst (MW: 848.33 g/mol) | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | — | — | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 185 | 165 | 77 | 60 | 53 |
| $M_n$ [kg/mol] | 100 | 84 | 78 | 38 | 35 | 29 |
| PDI | 2.4 | 2.13 | 2.11 | 2.03 | 1.71 | 1.82 |

1.02. Grubbs II Catalyst with 0.023 phr of Lithium Bromide Dissolved in Dimethylacetamide

| Grubbs II catalyst | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | LiBr | 0.023 | DMAc | 5.0 | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 140 | 78 | 42 | 23 | 22 |
| $M_n$ [kg/mol] | 100 | 66 | 40 | 24 | 13 | 14 |
| PDI | 2.4 | 2.12 | 1.95 | 1.75 | 1.76 | 1.58 |

1.03. Grubbs II Catalyst with 0.00475 phr of Lithium Bromide Dissolved in Dimethylacetamide

| Grubbs II catalyst | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | LiBr | 0.00475 | DMAc | 0.58 | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 138 | 105 | — | 52 | 47 |
| $M_n$ [kg/mol] | 100 | 69 | 56 | — | 31 | 28 |
| PDI | 2.4 | 2.0 | 1.88 | — | 1.68 | 1.7 |

1.04. Grubbs II Catalyst with 0.5 phr of Lithium Bromide

| Grubbs II catalyst | | | Salt addition | | | Temperature [° C.] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | LiBr | 0.5 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | — | 61 | 40 | 27 | — |
| $M_n$ [kg/mol] | 100 | — | 34 | 25 | 16 | — |
| PDI | 2.4 | — | 1.7 | 1.6 | 1.7 | — |

1.05. Grubbs II Catalyst with 5.08 phr of Lithium Bromide

| Grubbs II catalyst | | | Salt addition | | | Temperature [° C.] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | LiBr | 5.08 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 140 | 66 | 41 | 23 | — |
| $M_n$ [kg/mol] | 100 | 78 | 40 | 24 | 13 | — |
| PDI | 2.4 | 2.12 | 1.95 | 1.71 | 1.76 | — |

1.06. Grubbs II Catalyst with 12.45 phr of Caesium Bromide

| Grubbs II catalyst | | | Salt addition | | | Temperature [° C.] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | CsBr | 12.45 | — | — | 23 |

1.07. Grubbs II Catalyst with 2.55 phr of Lithium Chloride

| Grubbs II catalyst | | | Salt addition | | | Temperature [° C.] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | LiCl | 2.55 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 144 | 109 | 61 | 52 | — |
| $M_n$ [kg/mol] | 100 | 64 | 55 | 35 | 25 | — |
| PDI | 2.4 | 2.25 | 1.99 | 1.77 | 2.06 | — |

| Analytical data | Reaction time [min.] | | | | | |
|---|---|---|---|---|---|---|
| | 0 | 30 | 60 | 185 | 425 | 1300 |
| $M_w$ [kg/mol] | 240 | 170 | 111 | — | 50 | — |
| $M_n$ [kg/mol] | 100 | 75 | 54 | — | 29 | — |
| PDI | 2.4 | 2.3 | 2.1 | — | 1.7 | — |

1.08. Grubbs II Catalyst with 16.25 phr of Tetrabutylammonium Chloride

| Grubbs II catalyst | | | Salt addition | | | Temperature [° C.] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Bu$_4$NCl | 16.25 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | — | 91 | 51 | 38 | — |
| $M_n$ [kg/mol] | 100 | — | 51 | 30 | 23 | — |
| PDI | 2.4 | — | 1.8 | 1.7 | 1.7 | — |

1.09 Grubbs II Catalyst with 18.85 phr of Tetrabutylammonium Bromide

| Grubbs II catalyst | | | Salt addition | | | Temperature [° C.] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Bu$_4$NBr | 18.85 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 134 | 78 | 37 | 22 | — |
| $M_n$ [kg/mol] | 100 | 70 | 45 | 21 | 13 | — |
| PDI | 2.4 | 1.91 | 1.73 | 1.75 | 1.75 | — |

1.10 Grubbs II Catalyst with 21.6 phr of Tetrabutylammonium Iodide

| Grubbs II catalyst | | | Salt addition | | | Temperature [°C] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Bu₄NI | 21.60 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | — | 136 | — | — | — |
| $M_n$ [kg/mol] | 100 | — | 64 | — | — | — |
| PDI | 2.4 | — | 2.14 | — | — | — |

1.11 Grubbs II Catalyst with 17.23 phr of Tetrabutylphosphonium Chloride

| Grubbs II catalyst | | | Salt addition | | | Temperature [°C] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Bu₄PCl | 17.23 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 175 | — | — | — | — |
| $M_n$ [kg/mol] | 100 | 83 | — | — | — | — |
| PDI | 2.4 | 2.11 | — | — | — | — |

1.12. Grubbs II Catalyst with 19.85 phr of Tetrabutylphosphonium Bromide

| Grubbs II catalyst | | | Salt addition | | | Temperature [°C] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Bu₄PBr | 19.85 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 102 | 58 | 34 | 25 | — |
| $M_n$ [kg/mol] | 100 | 48 | 32 | 20 | 14 | — |
| PDI | 2.4 | 2.14 | 1.84 | 1.69 | 1.73 | — |

1.13. Grubbs II Catalyst with 24.53 phr of Tetraphenylphosphonium Bromide

| Grubbs II catalyst | | | Salt addition | | | Temperature [°C] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Ph₄PBr | 24.53 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 183 | 130 | — | — | — |
| $M_n$ [kg/mol] | 100 | 84 | 66 | — | — | — |
| PDI | 2.4 | 2.1 | 2.0 | — | — | — |

1.14. Grubbs II Catalyst with 32.98 phr of Tetraoctylphosphonium Bromide

| Grubbs II catalyst | | | Salt addition | | | Temperature [°C] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Oc₄PBr | 32.98 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 170 | 85 | 44 | 30 | — |
| $M_n$ [kg/mol] | 100 | 72 | 49 | 25 | 18 | — |
| PDI | 2.4 | 2.37 | 1.73 | 1.78 | 1.65 | — |

1.15. Grubbs II Catalyst with 17.58 phr of Tetrabutylammonium Thiocyanate

| Grubbs II catalyst | | | Salt addition | | | Temperature [°C] |
|---|---|---|---|---|---|---|
| Amount [mg] | Amount [phr] | Ru [ppm] | Salt Type | Amount [phr] | Solvent Type | Amount [phr] | |
| 20 | 0.05 | 60 | Bu₄NSCN | 17.58 | — | — | 23 |

| Analytical | Reaction time [min.] | | | | | |
|---|---|---|---|---|---|---|
| data | 0 | 30 | 60 | 185 | 425 | 1300 |
| $M_w$ [kg/mol] | 240 | — | 159 | — | — | — |
| $M_n$ [kg/mol] | 100 | — | 71 | — | — | — |
| PDI | 2.4 | — | 2.25 | — | — | — |

1.16. Grubbs II Catalyst with 2.93 phr of Tetraoctylammonium Chloride

| Grubbs II catalyst | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | Oc₄NCl | 2.93 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 149 | 112 | 57 | 40 | — |
| $M_n$ [kg/mol] | 100 | 69 | 56 | 35 | 22 | — |
| PDI | 2.4 | 2.2 | 2.0 | 1.7 | 1.8 | — |

1.17. Grubbs II Catalyst with 8.3 phr of Sodium Sulphate

| Grubbs II catalyst | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | Na₂SO₄ | 8.30 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 110 | 78 | 55 | 47 | — |
| $M_n$ [kg/mol] | 100 | 55 | 44 | 30 | 26 | — |
| PDI | 2.4 | 2.0 | 1.8 | 1.8 | 1.8 | — |

1.18. Grubbs II Catalyst with 4.03 phr of Lithium Nitrate

| Grubbs II catalyst | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | LiNO₃ | 4.03 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 182 | 106 | 66 | 57 | — |
| $M_n$ [kg/mol] | 100 | 75 | 53 | 37 | 32 | — |
| PDI | 2.4 | 2.43 | 2.00 | 1.78 | 1.78 | — |

1.19. Grubbs II Catalyst with 4.03 phr of Sodium Nitrite

| Grubbs II catalyst | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 20 | 0.05 | 60 | NaNO₂ | 4.03 | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 184 | 133 | — | 56 | — |
| $M_n$ [kg/mol] | 100 | 77 | 63 | — | 32 | — |
| PDI | 2.4 | 2.38 | 2.11 | — | 1.75 | — |

As a result of the salt additions in the trials 1.02. to 1.19., the molecular weights $M_w$ and $M_n$ were significantly reduced compared to the comparative experiment without salt addition (trial 1.01.). The salt additions thus improve the efficiency of the Grubbs II catalyst. In addition, the degraded nitrile rubbers obtained in the trials 1.02. to 1.19. were gel-free.

Salt Additions when Using the Hoveyda Catalyst 2.01. Comparative Experiment: Hoveyda Catalyst without Salt Addition

| Hoveyda catalyst (MW: 626.14 g/mol) | | | Salt addition | | | Temperature [° C.] |
|---|---|---|---|---|---|---|
| | | | Salt | | Solvent | |
| Amount [mg] | Amount [phr] | Ru [ppm] | Type | Amount [phr] | Type | Amount [phr] | |
| 8 | 0.02 | 32.3 | — | — | — | — | 23 |

| Analytical data | Reaction time [min.] | | | | | |
|---|---|---|---|---|---|---|
| | 0 | 30 | 60 | 185 | 425 | 1300 |
| $M_w$ [kg/mol] | 240 | 85 | 60 | 58 | 55 | — |
| $M_n$ [kg/mol] | 100 | 50 | 32 | 31 | 31 | — |
| PDI | 2.4 | 1.7 | 1.9 | 1.8 | 1.7 | — |

2.02. Hoveyda Catalyst with 5.08 ppm of Lithium Bromide

| Hoveyda catalyst (MW: 626.14 g/mol) | | | Salt addition | | | | Temperature [° C.] |
|---|---|---|---|---|---|---|---|
| Amount [mg] | Amount [phr] | Ru [ppm] | Salt Type | Amount [phr] | Solvent Type | Amount [phr] | |
| 8 | 0.02 | 32.3 | LiBr | 5.08 | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 60 | 36 | 28 | 25 | — |
| $M_n$ [kg/mol] | 100 | 26 | 20 | 15 | 15 | — |
| PDI | 2.4 | 2.3 | 1.8 | 1.9 | 1.7 | — |

As a result of the salt addition in trial 2.02., the molecular weights $M_w$ and $M_n$ were significantly reduced compared to the comparative experiments without salt addition (trial 2.01.). The salt addition thus improved the efficiency of the Hoveyda catalyst. In addition, the degraded nitrile rubbers obtained in the trial 2.02. were gel-free.

3.00. Salt Additions when Using the Buchmeiser-Nuyken Catalyst

3.01. Comparative Experiment: Buchmeiser-Nuyken Catalyst without Salt Addition

| Buchmeiser-Nuyken catalyst (MW: 781.14 g/mol) | | | Salt addition | | | | Temperature [° C.] |
|---|---|---|---|---|---|---|---|
| Amount [mg] | Amount [phr] | Ru [ppm] | Salt Type | Amount [phr] | Solvent Type | Amount [phr] | |
| 36.8 | 0.0092 | 119 | — | — | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 221 | 219 | 185 | 170 | — |
| $M_n$ [kg/mol] | 100 | 79 | 78 | 62 | 58 | — |
| PDI | 2.4 | 2.8 | 2.8 | 2.9 | 2.9 | — |

3.02. Buchmeiser-Nuyken Catalyst with 5.08 phr of Lithium Bromide

| Buchmeiser-Nuyken catalyst | | | Salt addition | | | | Temperature [° C.] |
|---|---|---|---|---|---|---|---|
| Amount [mg] | Amount [phr] | Ru [ppm] | Salt Type | Amount [phr] | Solvent Type | Amount [phr] | |
| 36.8 | 0.0092 | 119 | LiBr | 5.08 | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 117 | 43 | 23 | 17 | — |
| $M_n$ [kg/mol] | 100 | 50 | 24 | 14 | 10 | — |
| PDI | 2.4 | 2.3 | 1.8 | 1.6 | 1.6 | — |

As a result of the salt addition in trial 3.02., the molecular weights $M_w$ and $M_n$ were significantly reduced compared to the comparative experiments without salt addition (trial 3.01.). The salt addition thus improved the efficiency of the Buchmeiser-Nuyken catalyst. In addition, the degraded nitrile rubbers obtained in the trial 3.02. were gel-free.

4.00. Salt Additions when Using the Grela Catalyst

4.01. Comparative Experiment: Grela Catalyst without Salt Addition

| Grela catalyst (MW: 671.13 g/mol) | | | Salt addition | | | | Temperature [° C.] |
|---|---|---|---|---|---|---|---|
| Amount [mg] | Amount [phr] | Ru [ppm] | Salt Type | Amount [phr] | Solvent Type | Amount [phr] | |
| 15.8 | 0.0395 | 23.8 | — | — | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 37 | 35 | 33 | 31 | — |
| $M_n$ [kg/mol] | 100 | 23 | 22 | 22 | 20 | — |
| PDI | 2.4 | 1.61 | 1.59 | 1.50 | 1.55 | — |

4.02. Greta Catalyst with Addition of 5.08 phr of Lithium Bromide

| Grela catalyst (MW: 671.13 g/mol) | | | Salt addition | | | | Temperature [° C.] |
|---|---|---|---|---|---|---|---|
| Amount [mg] | Amount [phr] | Ru [ppm] | Salt Type | Amount [phr] | Solvent Type | Amount [phr] | |
| 15.8 | 0.0395 | 23.8 | LiBr | 5.08 | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 33 | 31 | 29 | 24 | — |
| $M_n$ [kg/mol] | 100 | 21 | 20 | 19 | 16 | — |
| PDI | 2.4 | 1.57 | 1.55 | 1.53 | 1.50 | — |

As a result of the salt addition in trial 4.02., the molecular weights $M_y$, and $M_r$, were reduced compared to the comparative experiments without salt addition (trial 4.01.). The salt addition thus improved the efficiency of the Grela catalyst. In addition, the degraded nitrile rubbers obtained in the trial 4.02. were gel-free.

5.0 Comparative Experiments: Hoveyda Catalyst without and with Addition of 2.32 phr of CuCl 5.01 Hoveyda Catalyst without Addition of CuCl

| Hoveyda catalyst (MW: 626.14 g/mol) | | | Salt addition | | | | Temperature [° C.] |
|---|---|---|---|---|---|---|---|
| Amount [mg] | Amount [phr] | Ru [ppm] | Type | Amount [phr] | Type | Amount [phr] | |
| 14.7 | 0.0368 | 2.37 | — | — | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 42 | 42 | 41 | 39 | — |
| $M_n$ [kg/mol] | 100 | 28 | 24 | 23 | 23 | — |
| PDI | 2.4 | 1.5 | 1.75 | 1.78 | 1.69 | — |

5.02 Hoveyda Catalyst with Addition of 2.32 phr of Copper(I) Chloride

| Hoveyda catalyst (MW: 626.14 g/mol) | | | Salt addition | | | | Temperature [° C.] |
|---|---|---|---|---|---|---|---|
| | | | Salt | | Solvent | | |
| Amount [mg] | Amount [phr] | Ru [ppm] | Type | Amount [phr] | Type | Amount [phr] | |
| 14.7 | 0.0368 | 2.37 | CuCl | 2.32 | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 104 | 92 | 90 | 93 | — |
| $M_n$ [kg/mol] | 100 | 58 | 54 | 53 | 54 | — |
| PDI | 2.4 | 1.79 | 1.70 | 1.69 | 1.72 | — |

Comparison of the trials 5.01 and 5.02 shows that the metathetic degradation using the Hoveyda catalyst proceeds even worse as a result of the addition of CuCl than when an additive is entirely dispensed with. When CuCl is added, both the mean molecular weight $M_w$ and also $M_n$ are more than twice as high after the same reaction times compared to the values of $M_w$ and $M_n$ achieved without salt addition.

6.0 Comparative Experiments: Grela Catalyst without and with Addition of 2.32 phr of CuCl 6.01 Grela Catalyst without Salt Addition

| Grela catalyst (MW: 671.13 g/mol) | | | Salt addition | | | | Temperature [° C.] |
|---|---|---|---|---|---|---|---|
| | | | Salt | | Solvent | | |
| Amount [mg] | Amount [phr] | Ru [ppm] | Type | Amount [phr] | Type | Amount [phr] | |
| 15.8 | 0.0395 | 2.38 | — | — | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 37 | 35 | 33 | 31 | — |
| $M_n$ [kg/mol] | 100 | 23 | 22 | 22 | 20 | — |
| PDI | 2.4 | 1.61 | 1.59 | 1.50 | 1.55 | — |

6.02 Grela Catalyst with Addition of 2.32 phr of CuCl

| Grela catalyst (MW: 671.13 g/mol) | | | Salt addition | | | | Temperature [° C.] |
|---|---|---|---|---|---|---|---|
| | | | Salt | | Solvent | | |
| Amount [mg] | Amount [phr] | Ru [ppm] | Type | Amount [phr] | Type | Amount [phr] | |
| 15.8 | 0.0395 | 2.38 | CuCl | 2.32 | — | — | 23 |

| | Reaction time [min.] | | | | | |
|---|---|---|---|---|---|---|
| Analytical data | 0 | 30 | 60 | 185 | 425 | 1300 |
| $M_w$ [kg/mol] | 240 | 101 | 96 | 94 | 100 | — |
| $M_n$ [kg/mol] | 100 | 58 | 53 | 55 | 58 | — |
| PDI | 2.4 | 1.74 | 1.81 | 1.71 | 1.72 | — |

Comparison of the trials 7.01 and 7.02 shows that the metathetic degradation using the Grela catalyst proceeds even worse as a result of the addition of CuCl than when an additive is entirely dispensed with. When CuCl is added, both the mean molecular weight $M_w$ and also $M_n$ are more than twice as high after the same reaction times compared to the values of $M_w$ and $M_n$ achieved without salt addition.

Example 7

Use of LiBr for the Ring-Closing Metathesis of Diethyl Diallylmalonate

The ring-closing metathesis of diethyl diallylmalonate was carried out once without and once with 1 mg of LiBr (Examples 7.01 and 7.02) and also once without and once with 1 mg of CsBr (Examples 8.01 and 8.02).

To carry out the experiments. 10 mg of Grubbs II catalyst were in each case placed in an NMR tube. In the examples according to the invention, which were carried out with additions of LiBr (Example 7.02) or CsBr (Example 8.02), 1 mg of LiBr or 1 mg of CsBr were weighed into the NMR tube in addition to the Grubbs II catalyst (10 mg). Subsequently, firstly 0.3 ml of chlorobenzene and then 0.2 ml of $CDCl_3$ were added at room temperature by means of a syringe. The contents of the NMR tube were mixed by shaking. After 2 minutes in each case, 0.15 ml of diethyl diallylmalonate was added by means of a syringe. The reaction conditions were determined by means of $^1$H-NMR spectroscopy at room temperature.

The following table clearly shows the accelerating effect of the addition of LiBr on the ring-closing methathesis of diethyl diallylmalonate.

| Time [min.] | Without salt addition (7.01) Conversion [%] | With salt addition (7.02) 1 mg of LiBr Conversion [%] |
|---|---|---|
| 0 | 0 | 0 |
| 30 | 21.3 | 55.4 |
| 60 | 57.7 | 100 |

Example 8

Use of CsBr for the Ring-Closing Metathesis of Diethyl Diallylmalonate

The experiments were carried out in a manner analogous to Example 7 using 1 mg of CsBr instead of 1 mg of LiBr.

| Time [min.] | Without salt addition (8.01) Conversion [%] | With salt addition (8.02) 1 mg of CsBr Conversion [%] |
|---|---|---|
| 0 | 0 | 0 |
| 15 | 13.4 | 16.5 |
| 30 | 25.3 | 40.3 |
| 60 | 46.5 | 68.9 |
| 90 | 71.9 | 84.7 |
| 150 | 96.2 | 100 |

What is claimed is:

1. A process for reacting a nitrile rubber comprising subjecting the nitrile rubber to a metathesis reaction in the presence of the catalyst system comprising a metathesis catalyst as a weight ratio of salt(s): metathesis catalysts is specified to be of from 0.01:1 to 10000:1 and one or more salts of the general formula (I)

$$K^{n+}A^{z-} \quad (I)$$

where
K is a cation with the exception of copper and
A is an anion,
where
n is 1, 2 or 3 and
z is 1, 2 or 3, wherein compounds of the general formula (A),

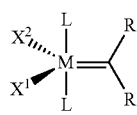

(A)

where
M is osmium or ruthenium,
the radicals R are identical or different and are each an alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, each of which may optionally be substituted by one or more alkyl, halogen, alkoxy, aryl or heteroaryl radicals,
$X^1$ and $X^2$ are identical or different and are two ligands, and
L represents identical or different ligands, are used as the catalyst.

2. The process according to claim 1, wherein $X^1$ and $X^2$ are identical or different and are each hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals.

3. The process to claim 2, wherein $X^1$ and $X^2$ are identical or different and are each halogen, benzoate, $C_1$-$_5$-carboxylate, $C_1$-$_5$-alkyl, phenoxy, $C_1$-$_5$-alkoxy, $C_1$-$_5$-alkylthiol, $C_6$-$C_{24}$-arylthiol, $C_6$-$C_{24}$-aryl or $C_1$-$_5$-alkylsulphonate.

4. The process according to claim 2, wherein $X^1$ and $X^2$ are identical and are each halogen, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$-$C_6H_4$-$SO_3$), mesylate (2,4,6-trimethylphenyl) or $CF_3SO_3$ (trifluoromethanesulphonate).

5. The process according to claim 1, wherein the two ligands L are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

6. The process according to claim 5, wherein the imidazolidine radical (Im) has a structure of the general formula (IIa) or (IIb),

(IIa)

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

* * * * *